(12) United States Patent
Jacobs (10) Patent No.: US 6,745,288 B2
(45) Date of Patent: Jun. 1, 2004

(54) STAGGERING CALL STACK OFFSETS FOR MULTIPLE DUPLICATE CONTROL THREADS

(75) Inventor: Brent William Jacobs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 10/152,431

(22) Filed: May 21, 2002

(65) Prior Publication Data

US 2003/0221067 A1 Nov. 27, 2003

(51) Int. Cl.[7] .............................................. G06F 12/08
(52) U.S. Cl. ........................ 711/118; 711/128; 711/132; 711/154; 711/170
(58) Field of Search ................................. 711/118, 128, 711/132, 154, 170

(56) References Cited

U.S. PATENT DOCUMENTS 6,212,604 B1 * 4/2001 Tremblay ................... 711/125

* cited by examiner

*Primary Examiner*—Hiep T. Nguyen
(74) *Attorney, Agent, or Firm*—Dugan & Dugan (57) ABSTRACT

When a new control thread is initialized in a multi-thread software program, it is determined whether a like control thread has previously been instantiated. If so, a stack offset for the new control thread is set to be staggered from the stack offset for the previously instantiated like thread. By staggering the stack offsets of respective duplicate control threads, cache conflicts may be minimized.

21 Claims, 6 Drawing Sheets

STAGGERING CALL STACK OFFSETS FOR MULTIPLE DUPLICATE CONTROL THREADS

FIELD OF THE INVENTION

The present invention is concerned with computer programs, and is more particularly concerned with computer programs that support multiple concurrent control threads.

BACKGROUND OF THE INVENTION

Many conventional operating systems support multiple concurrent control threads to allow multitasking of application programs. In some cases, duplicate control threads are operated concurrently, as occurs, for example, when plural input/output devices of the same type are independently controlled by respective control threads.

It is also conventional that each control thread be provided with a call stack. As is very familiar to those who are skilled in the art, a call stack is a collection of data structures called stack frames in which a previous stack frame pointer, return instruction pointer and relevant data are stored upon initialization of a call routine. The next instruction pointer and the relevant data are retrieved from the previous stack frame on the call stack at the end of the call routine.

The present invention addresses a problem that may be encountered in connection with caching of call stacks for multiple duplicate control threads.

Figure 1:
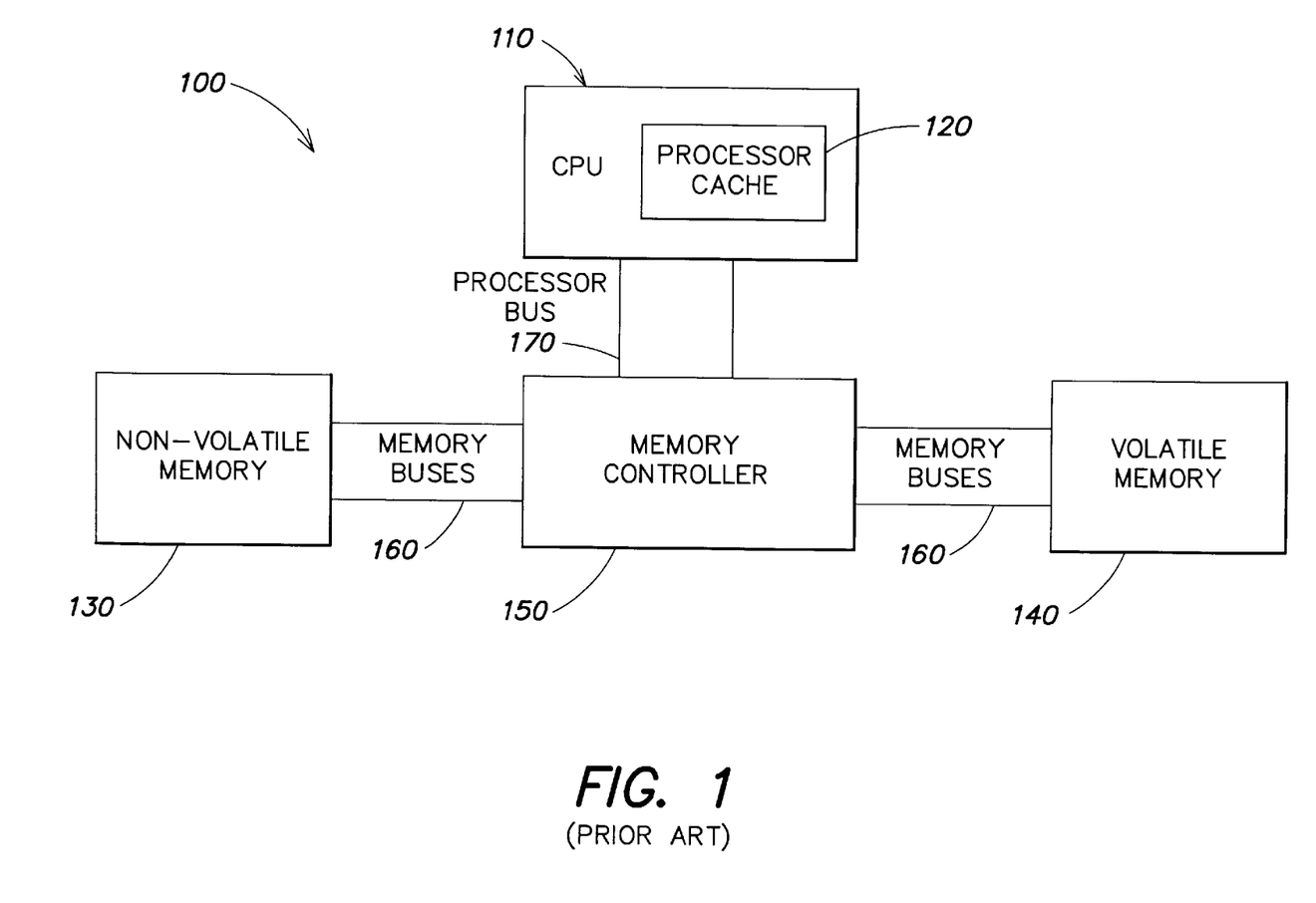
FIG. 1 is a simplified block diagram that illustrates a conventional computer system in which the present invention may be applied.

FIG. 1 is a simplified block diagram of a conventional computer system in which the present invention may be applied. Reference numeral 100 generally indicates the computer system, from which many customary components have been omitted to simplify the drawing. The computer system 100 includes a processor (CPU) 110, which may, for example, be one of the PowerPC™ family of devices available from International Business Machines. A cache memory 120 is associated with the processor 110. For example, the cache memory 120 may be on board the processor 110. Also accessible by the processor 110 are a non-volatile memory (e.g., ROM) 130 and a volatile memory (e.g., RAM) 140. The non-volatile memory 130 and the volatile memory 140 are connected to the processor 110 via a memory controller 150, memory busses 160 and a processor bus 170.

When the processor 110 performs a load or store instruction, the cache memory 120 is interrogated to determine if the needed data resides within the cache memory 120. If so, then the processor 110 either loads the data from or modifies the data within the cache memory 120. If the data does not reside within the cache memory 120, then the processor 110 issues a cache line fill operation to the memory controller 150. The memory controller 150 retrieves the data from the appropriate source, which may be either the non-volatile memory 130 or the volatile memory 140. The memory controller 150 then returns the data to the processor 110. If there is a usable empty line in the cache memory 120, then the data received via the memory controller 150 is placed in the empty line. If not, then a line of data is evicted from the cache memory 120, and the new data is put in the place of the evicted data. The processor 110 then loads the data from or modifies the requested data within the cache memory 120.

Because the cache memory 120 is on board or otherwise closely associated with the processor 110, accessing data in the cache memory 120 is much more rapid than accessing data in the non-volatile memory 130 or the volatile memory 140. Thus the use of the cache memory 120 may improve the performance of the computer system 100.

A cache memory or "cache" is customarily defined by its number of ways (described below), line size and total size. The number of blocks that a cache memory is divided into is equal to the total size of the cache memory divided by the line size.

When the data required by the processor 110 is not present in the cache memory 120 (which is sometimes referred to as a "cache miss"), the necessary data, in a length equal to the cache line size, is brought into the cache memory 120 from external memory such as the non-volatile memory 130 or the volatile memory 140 referred to above. The line of data is placed in one of the blocks of the cache memory 120. The "associativity" of the cache determines which blocks the data can be placed in. In a "fully associative" cache, the data can be placed in any of the blocks. In a "direct mapped" cache, the data can be placed in only one block, which is indicated by the least significant bits of the memory address from which the data was obtained.

In an "n-way set associative" cache, the memory address from which the data was obtained maps to one "set" of the cache. A set contains a number of blocks that is equal to n. The number of sets in a cache is determined by dividing the number of blocks in the cache by n. (A direct mapped cache can be thought of as a one-way set associative cache. A fully associative cache with m blocks can be thought of as an m-way set associative cache. Alternatively, a direct mapped cache can be thought of as having m sets, assuming m blocks in the cache, and a fully associative cache can be thought of as having one set.)

It is common to provide cache memories that are 2-way or 4-way set associative.

The particular set in which data will be placed in an n-way set associative cache is determined based on the memory block number (data address divided by cache line size) modulo the number of sets in the cache. The particular block within the set that is used to store the data may be determined, for example, using a Least Recently Used (LRU) algorithm.

The "span" of a cache is determined by dividing the total size of the cache by the number of ways. The span determines the range of data addresses that can be used before data addresses start to be placed within the same set. For example, assume that a cache has a span of 1K bytes and a cache line size of 32 bytes so that the cache has 32 sets. Data from a main memory data address of 0x400 is placed within set 0. Data from a main memory data address of 0x500 is placed in set 8, and data from a main memory data address of 0x800 is placed again within set 0. The number of different memory addresses that can be serviced in one set before a conflict occurs is determined by the number of ways of the cache memory.

FIGS. 2A–D are schematic illustrations of mapping of main memory addresses to different types of cache memories, in accordance with conventional practices. In FIGS. 2A–D, reference numeral 210 (FIG. 2A) indicates a simplified representation of main memory (such as the non-volatile and/or volatile memory 130, 140), reference numeral 230 (FIG. 2B) indicates a direct mapped cache, reference numeral 240 (FIG. 2C) indicates a fully associative cache, and reference numeral 250 (FIG. 2D) indicates a 2-way set associative cache. It is assumed that block 220 in memory 210 is to be cached. Block 220 has a block address of 13. The direct mapped cache 230 (FIG. 2B) has eight blocks or sets (indicated by reference numeral 235). Since 13 modulo 8 equals 5, the data from block 220 (block address 13) of the main memory 210 would be placed in block number 5 of the direct mapped cache 230, as indicated by reference numeral 280.

Figure 2A:
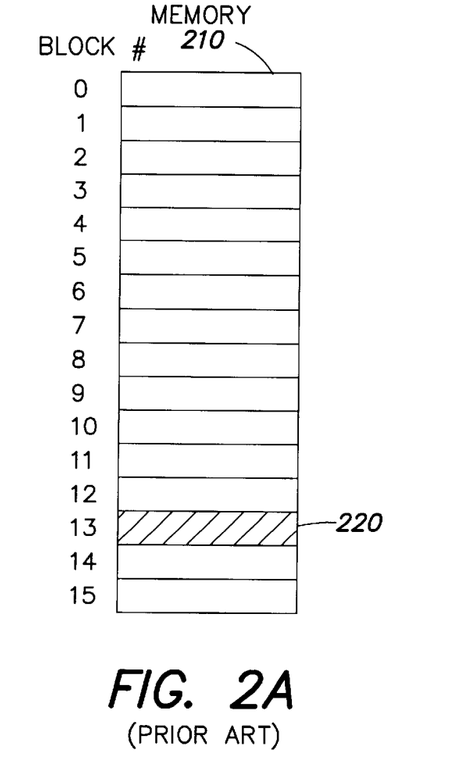
FIGS. 2A–D are schematic illustrations of mapping of main memory addresses to different types of cache memories, in accordance with conventional practices.
Figure 2B:
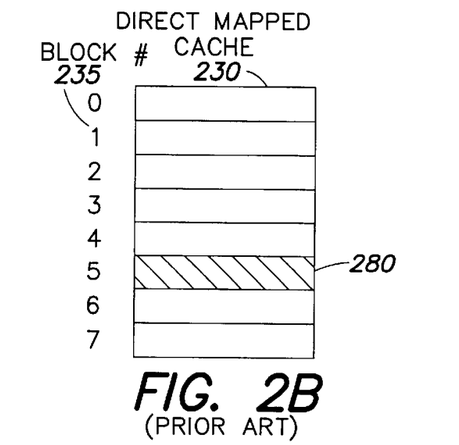
Figure 2C:
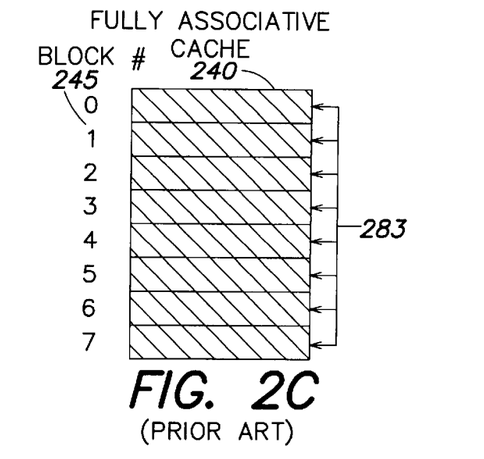

In the case of the fully associative cache 240 (FIG. 2C), there are eight blocks (reference numeral 245) corresponding to eight ways or one set. The data from block 220 of the main memory 210 can be placed in any of the eight blocks of the fully associative cache 240, as indicated by reference numeral 283.

Figure 2D:
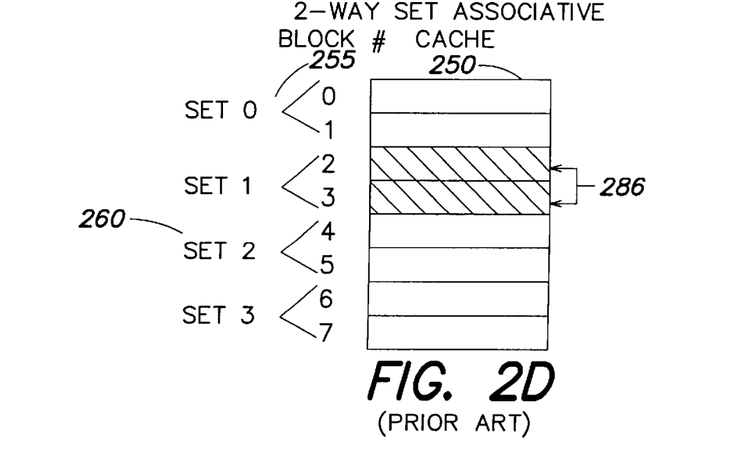

In the case of the 2-way set associative cache 250 (FIG. 2D), there are four sets (reference numeral 255) of two blocks each. Since 13 modulo 4 equals 1, the data from block 220 (block address 13) of the main memory 210 (FIG. 2A) may be stored in either of the two blocks (blocks 2 and 3) of set 1 (reference numeral 260), as indicated by reference numeral 286 (FIG. 2D).

Figure 3:
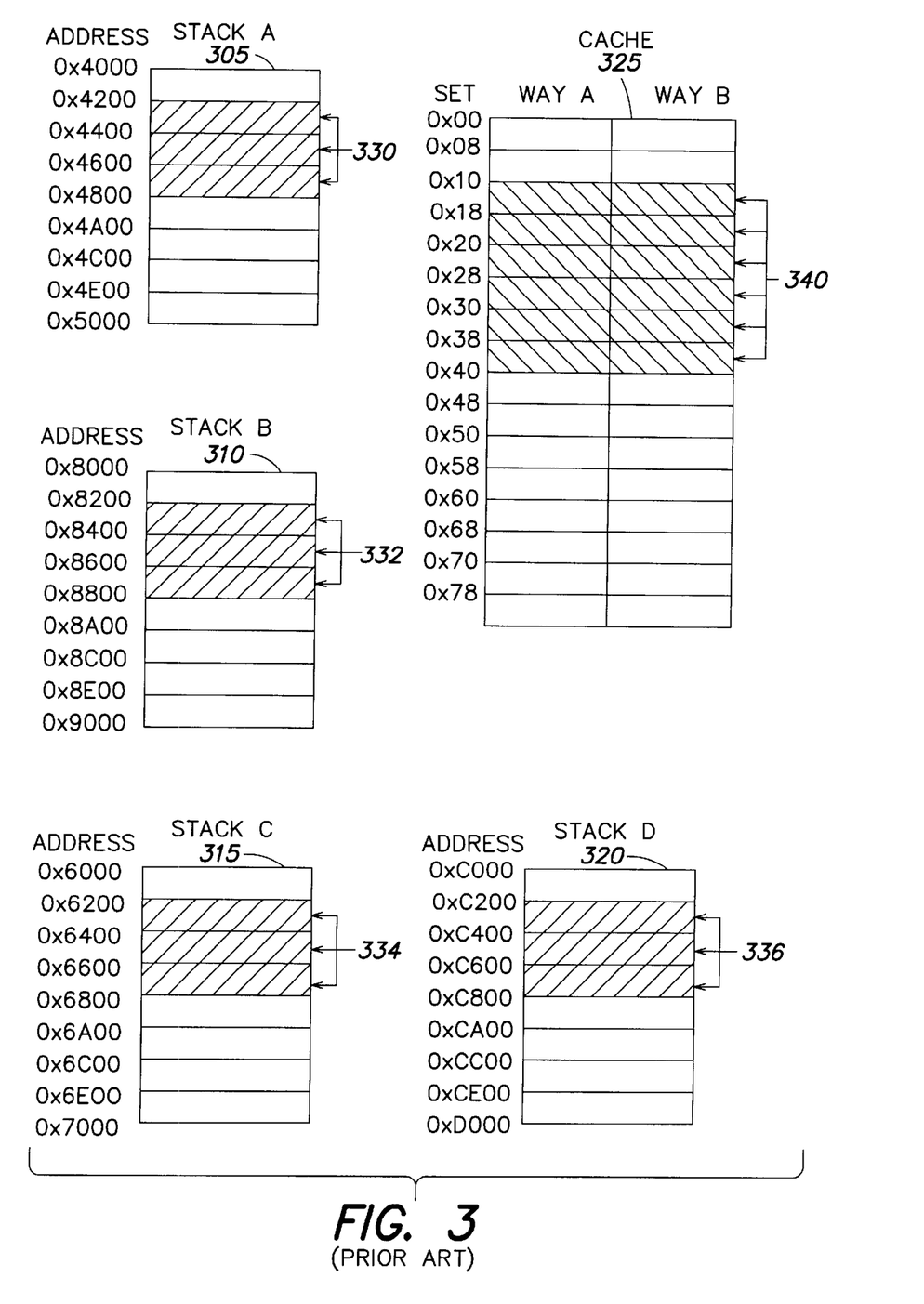
FIG. 3 is a schematic illustration of a problem identified by the present inventor in relation to caching of call stacks for duplicate control threads.

FIG. 3 is a schematic illustration that illustrates a problem identified by the present inventor that may be encountered in connection with caching of call stacks for duplicate control threads. In the example shown in FIG. 3, it is assumed that four duplicate threads respectively have stacks 305 (stack A), 310 (stack B), 315 (stack C) and 320 (stack D).

It is further assumed that each of the stacks 305, 310, 315, 320 is allocated one page (4K) of virtual memory space, and that stack A (reference numeral 305) starts at address 0x4000, stack B (reference numeral 310) begins at address 0x8000, stack C (reference numeral 315) begins at address 0x6000 and stack D (reference numeral 320) begins at address 0xC000.

It is further assumed that a 2-way (Way A and Way B) set associative cache 325 is employed. In this example, the cache 325 has a total size of 8K bytes, with cache lines 32 bytes in length, providing 128 sets.

As noted above, the stacks 305, 310, 315 and 320 are assumed to be used by duplicate control threads, i.e., four separate instantiations running the same thread of instructions. It is further assumed that each stack has a highly utilized area, indicated respectively at 330, 332, 334 and 336 for the stacks 305, 310, 315 and 320. Since the stacks 305, 310, 315 and 320 correspond to duplicate threads, the highly utilized areas 330, 332, 334 and 336 are at identical offsets (bytes 0x0200 to 0x07FF) within each stack. These highly utilized areas 330, 332, 334 and 336 all map to the same sets (0x10 through 0x3F) within the cache 325, as indicated by reference numeral 340. Because the cache 325 is only 2-way, only two of the stacks 305, 310, 315, 320 can have data within a set at any one time. Since four identical threads having the stacks 305, 310, 315, 320 are in competition for the sets indicated by reference numeral 340, there are frequent conflicts, leading to "thrashing", i.e., data for one of stacks 305, 310, 315, 320 frequently being evicted from the cache 325 to make room for data of another one of the stacks 305, 310, 315, 320. The overhead resulting from frequent eviction of data from the cache 325, and frequent cache misses, may adversely affect the performance of the computer system.

SUMMARY OF THE INVENTION

According to a first aspect of the invention, a method of initializing a control thread in a multi-thread software program is provided. The method includes receiving an instruction to initialize a new control thread, determining whether the new control thread is a duplicate of an existing control thread, and setting a stack offset for the new control thread based on a result of the determining step. A "stack offset" will be understood to mean the offset within a memory space allocated to a call stack at which the first stack frame for the call stack is placed. A "stack frame" means a collection of data placed on a call stack for a particular instruction. A stack frame may include, for example, a return instruction pointer, a previous frame pointer and local variables.

In at least one embodiment, the determining step may include comparing a first instruction pointer for the new control thread with a first instruction pointer for the existing control thread. If the new control thread is determined to be a duplicate of the existing control thread, the stack offset for the new control thread may be set to be different from a stack offset of the existing control thread. In one or more embodiments, the stack offset of the existing control thread may be zero. In one or more embodiments the stack mapping for the new control thread may have a last virtual page that is equal in size to the stack offset for the new control thread and is mapped to begin at a zero address of a physical memory page. A "stack mapping" will be understood to mean a mapping to physical memory of one or more virtual memory pages allocated to a call stack.

In at least one embodiment, the setting of the stack offset for the new control thread may include adding a predetermined value to the stack offset of the existing control thread. For example, the stack offset of the new control thread may be set to zero if the sum of the predetermined value and the stack offset of the existing control thread equals a span length of a cache used to store call stacks for the new control thread and the existing call thread.

According to a second aspect of the invention, another method of initializing a control thread in a multithread software program is provided. The inventive method according to the second aspect of the invention includes receiving an instruction to initialize a new control thread and traversing a list of existing control threads. The inventive method according to the second aspect of the invention further includes determining, for each existing control thread in the list of existing control threads, whether the new control thread is a duplicate of the existing control thread; and setting a stack offset for the new control thread based on a result of the determining step.

According to a third aspect of the invention, a method includes comparing a new control thread with an existing control thread, determining whether the new control thread is a duplicate of the existing control thread on the basis of the comparing step, and, if the new control thread is determined to be a duplicate of the existing control thread, setting a stack offset for the new control thread to be different from a stack offset of the existing control thread.

Numerous other aspects are provided, as are computer systems which implement the above-described methods, and computer program products. Each inventive computer program product may be carried by a medium readable by a computer (e.g., a carrier wave signal, a floppy disk, a hard drive, a random access memory, etc.).

By setting respective stack offsets to be different for each duplicate control thread, the present invention may reduce cache conflicts, thereby enhancing the efficiency of operation of a multi-threaded program when the multiple threads include duplicate threads.

Other objects, features and advantages of the present invention will become more fully apparent from the following detailed description of exemplary embodiments, the appended claims and the accompanying drawings.

DETAILED DESCRIPTION

Figure 4:
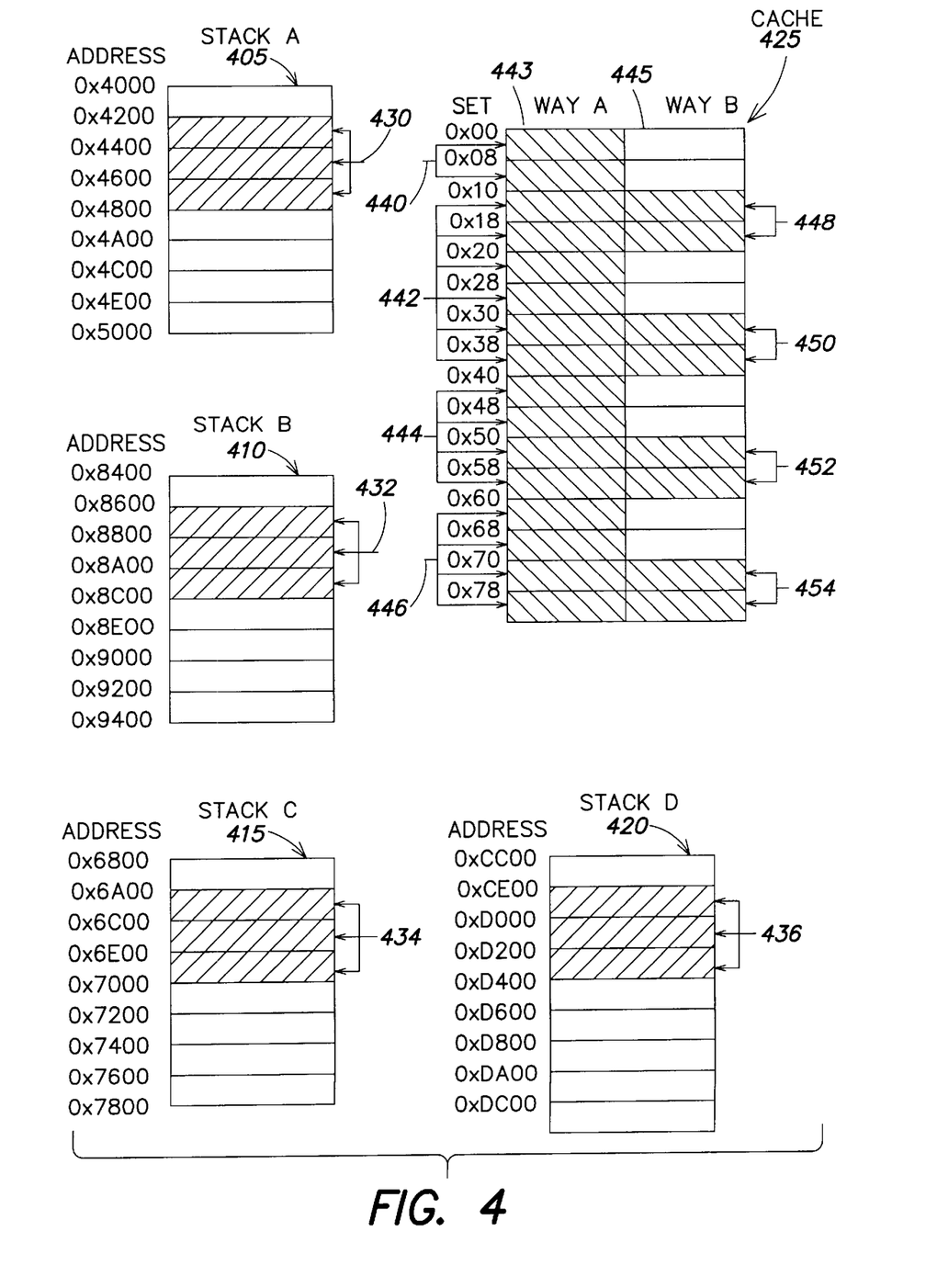
FIG. 4 schematically illustrates an example of staggered stack offsets provided in accordance with the invention to overcome the problem illustrated in FIG. 3.

FIG. 4 is a schematic illustration of an example of staggered stack offsets provided in accordance with the invention to overcome the problem illustrated in FIG. 3.

Referring to FIG. 4, it is again assumed that stacks A, B, C and D (reference numerals 405, 410, 415, 420) correspond to duplicate threads. It is further assumed that a 2-way set associative cache memory 425 is used, having a total size of 8K bytes, cache lines of 32 bytes in length, and 128 sets. Also, as in the example of FIG. 3, highly utilized areas (reference numerals 430, 432, 434 and 436) of stacks 405, 410, 415, 420, respectively are at a byte offset of 0x0200 to 0x07FF from the beginning of each stack.

However, in accordance with the invention, the stacks A, B, C, D (reference numerals 405, 410, 415, 420) have staggered offsets. Although stack A (reference numeral 405) starts at virtual address 0x4000 as in the example of FIG. 3, stack B (reference numeral 410) begins at virtual address 0x8400, instead of address 0x8000 as in the example of FIG. 3. Similarly, stack C (reference numeral 415) begins at virtual address 0x6800 instead of address 0x6000 and stack D (reference numeral 420) begins at virtual address 0xCC00 instead of address 0xC000. Thus stack A (reference numeral 405) has a zero offset relative to the beginning of a memory page, stack B (reference numeral 410) has an offset of 0x400 relative to the beginning of a memory page, stack C (reference numeral 415) has an offset of 0x800 relative to the beginning of a memory page, and stack D (reference numeral 420) has an offset of 0xC00 relative to the beginning of a memory page. The staggered offsets for the stacks 405, 410, 415, 420 change the mapping of the stacks into the cache 425, and distribute the mappings of the highly utilized areas 430, 432, 434, 436 throughout the various sets of the cache 425.

More particularly, the highly utilized area 430 of the stack 405 (stack A) is mapped, as in the example of FIG. 3, into sets 0x10 through 0x3F of the cache 425, as indicated by reference numeral 442. All of the highly utilized area 430 of the stack 405 (stack A) is accommodated in way A (reference numeral 443) of the cache 425.

The highly utilized area 432 of the stack 410 (stack B) is mapped to sets 0x30 through 0x5F of the cache 425. Because way A (reference numeral 443) of the cache 425 for the sets 0x30 through 0x3F is occupied by the highly utilized area 430 of stack A (reference numeral 405), the highly utilized area 432 of the stack 410 (stack B) is partially accommodated in way B (reference numeral 445) of the cache 425, as indicated by reference numeral 450, and the balance of the highly utilized area 432 of the stack 410 (stack B) is stored in way A (reference numeral 443) of the cache 425, as indicated by reference numeral 444.

The highly utilized area 434 of the stack 415 (stack C) is mapped to sets 0x50 through 0x7F. The highly utilized area 434 of the stack 415 (stack C) is partially stored in way B (reference numeral 445) as indicated by reference numeral 452 (since way A (reference numeral 443) for the corresponding sets (0x50 through 0x5F) is occupied by the highly utilized area 432 of the stack 410 (stack B)). The balance of the highly utilized area 434 of the stack 415 (stack C) is stored in way A (reference numeral 443), as indicated by reference numeral 446.

The highly utilized area 436 of the stack 420 (stack D) is mapped into sets 0x70 through 0x7F and sets 0x00 through 0x1F of the cache 425. Portions of the highly utilized area 436 of the stack 420 (stack D) are stored in way B (reference numeral 445) of the cache 425, as indicated by reference numerals 454 and 448, because way A (reference numeral 443) of the corresponding sets of the cache 425 are occupied by the highly utilized area 434 of the stack 415 (stack C) and by the highly utilized area 430 of the stack 405 (stack A). The balance of the highly utilized area 436 of the stack 420 (stack D) is stored in way A (reference numeral 443) of the cache 425, as indicated by reference numeral 440. Because of the staggered stack offsets provided in accordance with the invention in the example of FIG. 4, all of the data from the highly utilized areas 430, 432, 434, 436 can be contained in the cache 425 without conflicting, contrary to the example of conventional practices illustrated in FIG. 3, in which conflicts begin to occur for more than two duplicate threads. Other stack offsets than those described may be employed.

Figure 5A:
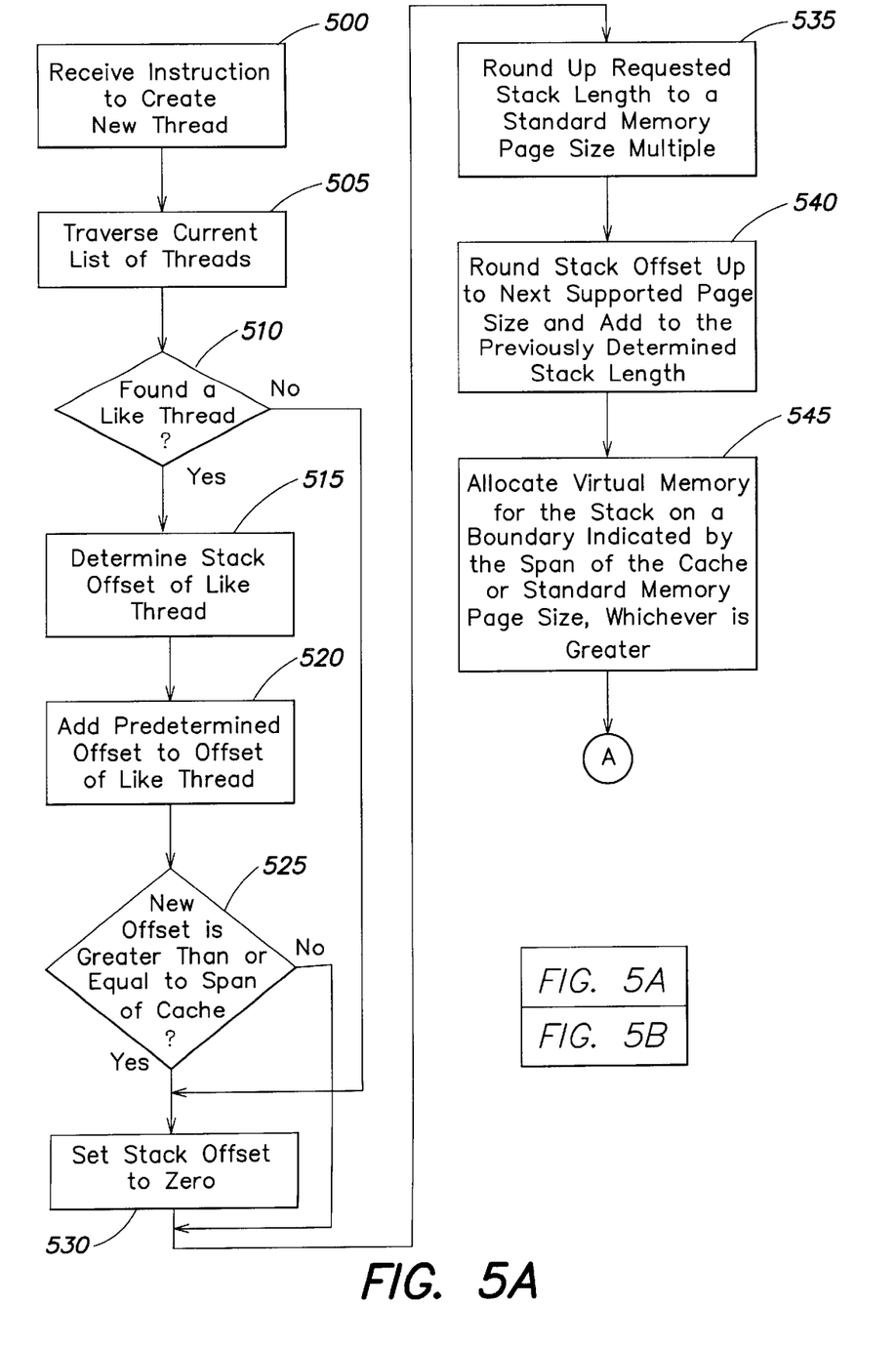
FIGS. 5A and 5B are a flow chart that illustrates a process to provide staggered stack offsets in accordance with the present invention.
Figure 5B:
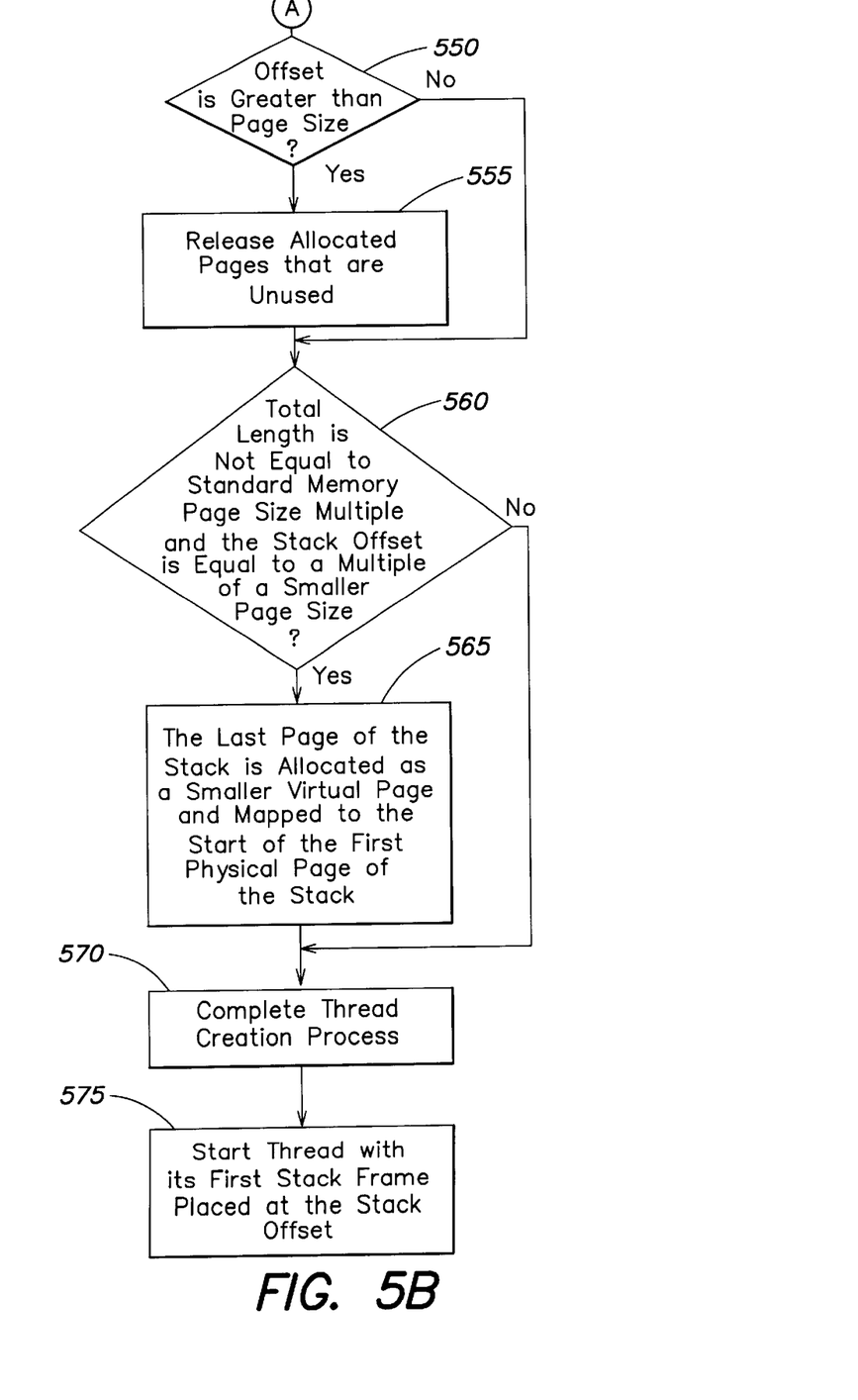

FIGS. 5A–B are a flow chart that illustrates a process for providing staggered stack offsets for duplicate control threads in accordance with the invention. The inventive process of FIGS. 5A–B may, for example, be applied in a computer system such as the computer system 100 illustrated in FIG. 1. The software required to carry out the inventive process may be developed by a person of ordinary skill in the art based on the disclosure herein and may include one or more computer program products. The software may be stored, for example, in the volatile memory 140 or the non-volatile memory 130 of the computer system 100.

The process of FIGS. 5A–B begins with a block 500, at which an instruction is received to create a new thread. Next, at block 505, the current list of threads is traversed, from the newest thread toward the oldest, to determine whether the new thread to be created is a duplicate of a thread in the list. The determination of whether there is an existing like thread in the list of threads may be made by comparing a first instruction pointer for the new thread with the first instruction pointer for each thread in the list of threads. The traversing step may be ended upon finding an existing thread of which the new thread is a duplicate. If no such existing thread is found, the entire list of existing threads is traversed.

Following step 505 is a decision block 510, at which it is determined whether a like thread was found in the list of threads. If so, then block 515 follows decision block 510. At block 515, the stack offset of the most recently created like thread (which will be the first like thread found in the search for like threads) is determined. Then, at block 520, a predetermined additional offset is added to the offset of the like thread to create a new stack offset value. The predetermined additional offset may be determined, for example, based on an extent of the stack that is found to be highly utilized for the particular control thread. Other criteria for determining stack offset may be employed. Following block 520 is a decision block 525, at which it is determined whether the new stack offset value is greater than or equal to the span of the cache. If so, the stack offset value is set to zero (block 530). Otherwise, step 530 is skipped, and the stack offset value remains as results from block 520. (It should also be noted that if a negative determination is made at decision block 510, i.e., if no like thread is found in the list of threads, then in this case the stack offset value is also set to zero (block 530)).

Following block 530 or decision block 525, as the case may be, is block 535. At block 535, the requested length of the stack for the new thread is rounded up to an integral multiple of the standard page size. Then, at block 540, the stack offset value is rounded up to the next page size supported by the processor in question (which may be less than the standard page size in some cases, such as if the processor is of the above-mentioned PowerPC™ family of devices). Then, the rounded-up stack offset value is added to the stack length determined at (i.e., rounded up at) block 535. Next, at block 545, virtual memory for the stack is allocated starting at a boundary indicated by the greater of the span of the cache or the standard memory page size. That is, the stack space is allocated beginning with an address that is an integral multiple of the larger of the cache span and the standard memory page size. It is then determined, at decision block 550, whether the stack offset value is greater than the standard page size. (This can occur only if the span of the cache is greater than the standard page size.) If it is found at decision block 550 that the stack offset value is greater than the standard page size, then block 555 follows. At block 555 the allocated pages that are unused are released. If a negative determination in made at decision block 550, then block 555 is skipped.

Following decision block 550 or block 555, as the case may be, is decision block 560. At decision block 560, it is determined whether or not the total length of the stack, as calculated at block 540, is equal to an integral multiple of the standard memory page size. If the total length of the stack as calculated at block 540 is not equal to a multiple of the standard memory page size, and the stack offset is equal to a multiple of a smaller page size, then block 565 follows decision block 560. At block 565 the last page of the stack is allocated as a virtual page that is smaller than the standard memory page size, and is mapped to the start of the first physical page of the stack. Taking stack C (reference numeral 415) of FIG. 4 as an example, the virtual addresses of that stack in the range 0x6800 through 0x6FFF are mapped to the second half of a physical page, and the virtual addresses in the range 0x7000 through 0x77FF are mapped to the first half of the same physical page. In this way, the stack offset does not cause physical memory to go unused. It is assumed for the purposes of block 565 that the processor to be utilized supports smaller than standard page sizes, as is the case with the above-referenced PowerPC™ family of devices.

If it is determined at decision block 560 that the total length of the stack as calculated at block 540 is equal to an integral multiple of the standard memory page size, then block 565 is skipped.

Following block 565 or directly following decision block 560, as the case may be, is block 570, at which the thread creation process is completed for the new thread. Then, at block 575, the thread is started with its first stack frame placed at the stack offset (determined at block 520 or block 530, as the case may be) relative to the beginning memory position that was established at block 545.

It will be recognized that the cumulative effect of the process of FIGS. 5A–B, and particularly block 575, is to stagger the respective stack offsets of a plurality of duplicate control threads. As a result, as explained in connection with FIG. 4, conflicts over cache resources may be minimized, thereby preventing or reducing "thrashing" of cache locations, and improving the efficiency of operation of the computer system. To simplify implementation, an extra physical and virtual page may be allocated if the stack offset is non zero so that the intended length of the stack can be maintained (e.g., as opposed to mapping a smaller virtual page over the beginning of the first physical page).

The foregoing description discloses only exemplary embodiments of the invention; modifications of the above disclosed apparatus and methods which fall within the scope of the invention will be readily apparent to those of ordinary skill in the art. For example, it is contemplated to utilize the invention with processors other than the PowerPC™ family of devices. It is also contemplated to utilize the invention in conjunction with processors that only support standard page sizes, in which case blocks 560 and 565 may be omitted from the process of FIGS. 5A–B. In addition, the stack length and stack offset in blocks 540 and 545 can be added together before rounding up.

Moreover, the order of process steps indicated in FIGS. 5A–B is not required, and it is contemplated to use any sequence of process steps that is practical.

Furthermore, although the invention was illustrated in conjunction with a 2-way set associative cache, it is also contemplated to apply the present invention in conjunction with a direct mapped cache, or with an n-way set associative cache where n>2.

Accordingly, while the present invention has been disclosed in connection with exemplary embodiments thereof, it should be understood that other embodiments may fall within the spirit and scope of the invention, as defined by the following claims.

The invention claimed is:

1. A method of initializing a control thread in a multi-thread software program, the method comprising:
   receiving an instruction to initialize a new control thread;
   determining whether the new control thread is a duplicate of an existing control thread; and
   setting a stack offset for the new control thread based on a result of the determining step.

2. The method of claim 1, wherein the determining step includes comparing a first instruction pointer for the new control thread with a first instruction pointer for the existing control thread.

3. The method of claim 1, wherein, if the new control thread is determined to be a duplicate of the existing control thread, the stack offset for the new control thread is set to be different from a stack offset of the existing control thread.

4. The method of claim 3, wherein the stack offset of the existing control thread is zero.

5. The method of claim 3, wherein the setting of the stack offset for the new control thread includes adding a predetermined value to the stack offset of the existing control thread.

6. The method of claim 5, wherein the stack offset of the new control thread is set to zero if the sum of the predetermined value and the stack offset of the existing control thread equals a span length of a cache memory used to store call stacks for the new control thread and the existing call thread.

7. The method of claim 1, wherein a stack mapping for the new control thread has a last virtual page that is equal in size to the stack offset for the new control thread and is mapped to begin at a zero address of a physical memory page.

8. A method of initializing a control thread in a multi-thread software program, the method comprising:

receiving an instruction to initialize a new control thread;
traversing a list of existing control threads;
for each existing control thread in the list of existing control threads, determining whether the new control thread is a duplicate of the existing control thread; and
setting a stack offset for the new control thread based on a result of the determining step.

9. The method of claim 8, wherein the determining step includes comparing a first instruction pointer for the new control thread with a first instruction pointer for the existing control thread.

10. A method, comprising:
comparing a new control thread with an existing control thread;
on the basis of the comparing step, determining whether the new control thread is a duplicate of the existing control thread; and
if the new control thread is determined to be a duplicate of the existing control thread, setting a stack offset for the new control thread to be different from a stack offset of the existing control thread.

11. The method of claim 10, wherein the comparing step includes comparing a first instruction pointer for the new control thread with a first instruction pointer for the existing control thread.

12. The method of claim 10, wherein the stack offset of the existing control thread is zero.

13. The method of claim 10, wherein a stack mapping for the new control thread has a last virtual page that is equal in size to the stack offset for the new control thread and is mapped to begin at a zero address of a physical memory page.

14. The method of claim 10, wherein the setting step includes adding a predetermined value to the stack offset of the existing control thread.

15. The method of claim 14, wherein the stack offset of the new control thread is set to zero if the sum of the predetermined value and the stack offset of the existing control thread equals a span length of a cache used to store call stacks for the new control thread and the existing call thread.

16. A computer system, comprising:
a memory; and
a processor operatively coupled to the memory and programmed to:
receive an instruction to initialize a new control thread;
determine whether the new control thread is a duplicate of an existing control thread; and
set a stack offset for the new control thread based on a result of the determining step.

17. A computer system, comprising:
a memory; and
a processor operatively coupled to the memory and programmed to:
receive an instruction to initialize a new control thread;
traverse a list of existing control threads;
for each existing control thread in the list of existing control threads, determine whether the new control thread is a duplicate of the existing control thread; and
set a stack offset for the new control thread based on a result of the determining step.

18. A computer system, comprising:
a memory; and
a processor operatively coupled to the memory and programmed to:
compare a new control thread with an existing control thread;
based on the comparison of the new and existing control threads, determine whether the new control thread is a duplicate of the existing control thread; and
if the new control thread is determined to be a duplicate of the existing control thread, set a stack offset for the new control thread to be different from a stack offset of the existing control thread.

19. A computer program product comprising:
a medium readable by a computer, the computer readable medium having computer program code adapted to:
receive an instruction to initialize a new control thread;
determine whether the new control thread is a duplicate of an existing control thread; and
set a stack offset for the new control thread based on a result of the determining step.

20. A computer program product comprising:
a medium readable by a computer, the computer readable medium having computer program code adapted to:
receive an instruction to initialize a new control thread;
traverse a list of existing control threads;
for each existing control thread in the list of existing control threads, determine whether the new control thread is a duplicate of the existing control thread; and
set a stack offset for the new control thread based on a result of the determining step.

21. A computer program product comprising:
a medium readable by a computer, the computer readable medium having computer program code adapted to:
compare a new control thread with an existing control thread;
based on the comparison of the new and existing control threads, determine whether the new control thread is a duplicate of the existing control thread; and
if the new control thread is determined to be a duplicate of the existing control thread, set a stack offset for the new control thread to be different from a stack offset of the existing control thread.

* * * * *